United States Patent
Wilms et al.

(10) Patent No.: US 8,370,986 B2
(45) Date of Patent: Feb. 12, 2013

(54) CONNECTING DEVICE FOR A WIPER ARM

(75) Inventors: Christian Wilms, Koersel-Beringen (BE); Dave Claes, Tildonk (BE)

(73) Assignee: Robert Bosch GmbH, Stuttgart (DE)

( * ) Notice: Subject to any disclaimer, the term of this patent is extended or adjusted under 35 U.S.C. 154(b) by 1067 days.

(21) Appl. No.: 12/090,913

(22) PCT Filed: Sep. 29, 2006
(Under 37 CFR 1.47)

(86) PCT No.: PCT/EP2006/066894
§ 371 (c)(1),
(2), (4) Date: Dec. 10, 2008

(87) PCT Pub. No.: WO2007/045549
PCT Pub. Date: Apr. 26, 2007

(65) Prior Publication Data
US 2012/0000028 A1    Jan. 5, 2012

(30) Foreign Application Priority Data

Oct. 21, 2005  (DE) .......................... 10 2005 050 569

(51) Int. Cl.
*B60S 1/40* (2006.01)
(52) U.S. Cl. ............. 15/250.201; 15/250.32; 15/250.43; 15/250.351
(58) Field of Classification Search ............... 15/250.32, 15/250.351, 250.201, 250.361, 250.43
See application file for complete search history.

(56) References Cited

U.S. PATENT DOCUMENTS
6,553,607 B1    4/2003  De Block
(Continued)

FOREIGN PATENT DOCUMENTS
DE  10000374    *  7/2001
DE  10160111 A1    7/2003
(Continued)

OTHER PUBLICATIONS
PCT/EP2006/066894 International Search Report.

*Primary Examiner* — Gary Graham
(74) *Attorney, Agent, or Firm* — Michael Best & Friedrich LLP

(57) ABSTRACT

The invention relates to a connecting device (10) for a wiper arm (14) and a wiper blade (12). Said wiper blade comprises a first connecting part (16) on the wiper blade end and a second connecting part (18) on the wiper arm end, both parts being juxtaposed in the operational position and being connected to each other via a hinge element (44) so that they can be swiveled about a hinge axis. Securing means (32) are provided so that the first and second connecting part (16, 18) engage with each other. The invention is characterized in that the first connecting part (16) has a recess (38) for accommodating the securing means (32) in which a longitudinal, shaped portion (66) is provided which is parallel to the hinge axis. The invention also relates to a flat bar wiper blade (12) which comprises a first connecting part (16) for fastening the flat bar wiper blade (12) to a wiper arm (14). The connecting part (16) comprises a counter-hinge element (42) so that the flat bar wiper blade (12) can be connected to the wiper arm (14) so that it can be swiveled about a hinge axis. Said flat bar wiper blade is characterized in that a recess (38) for accommodating a securing means (32) is provided in which a longitudinal, shaped portion (66) is provided which is parallel to the hinge axis.

21 Claims, 7 Drawing Sheets

U.S. PATENT DOCUMENTS

| | | |
|---|---|---|
| 6,611,988 B1 * | 9/2003 | De Block .................. 15/250.32 |
| 2004/0074037 A1 | 4/2004 | Op't Roodt |
| 2004/0093681 A1 * | 5/2004 | Op't Roodt ................ 15/250.32 |
| 2006/0130263 A1 * | 6/2006 | Coughlin .................. 15/250.32 |

FOREIGN PATENT DOCUMENTS

| | | | |
|---|---|---|---|
| DE | 10230457 | A1 | 1/2004 |
| DE | 10330218 | A1 | 1/2005 |
| DE | 10349637 | A1 | 6/2005 |
| FR | 2846616 | A1 | 5/2004 |
| FR | 2848958 | * | 6/2004 |
| WO | 2004002792 | | 1/2004 |
| WO | WO2004/002792 | * | 1/2004 |

* cited by examiner

CONNECTING DEVICE FOR A WIPER ARM

BACKGROUND OF THE INVENTION

The invention relates to a connecting device for a wiper arm as well as a flat bar wiper blade.

Already known from DE-A-102 30 457 is a connecting device for a wiper arm and a wiper blade, which has a first connecting part on the wiper blade side and a second connecting part on the wiper arm side, which are juxtaposed in the operational position. The second connecting part has a hinge element so that the wiper blade is connected to the wiper arm so that it can swivel around a hinge axis, wherein a securing means is provided so that the two connecting parts engage with one another.

In addition, numerous devices for connecting wiper arms to wiper blades are known in which the connecting part on the wiper arm side is arranged above the connecting part on the wiper blade side.

What is problematic with these types of connecting devices, however, is that they have an unfavorable flow profile and due to their structural height are subject to high wind resistance from the air stream wind of the motor vehicle. In addition, despite the flat design a pleasing outward appearance must be guaranteed.

SUMMARY OF THE INVENTION

The advantage of the connecting device in accordance with the invention is that the first connecting part has a receptacle for accommodating the securing means, in which a longitudinal shaped portion, particularly a groove, is provided which is parallel to the hinge axis. Improved flow behavior is achieved in this way and a low structural height of the connecting device or of the wiper arm with the wiper blade is also achieved.

In a simple and cost-effective embodiment, the securing means is comprised of a bridge with a limit. This guarantees that the wiper blade cannot detach from the wiper arm when in operation.

It is especially advantageous in this case if the securing means at least partially overlaps the first connecting part and the limit is arranged such that, in the operational position, the first connecting part and the second connecting part are locked against axial displacement on the hinge axis.

Simple handling is achieved in a cost-effective manner in that the first connecting part can be detached from and/or connected to the second connecting part by one rotation of one of the connecting parts around the hinge element by at least a detachment angle. In this way, it is possible to separate the wiper blade from the wiper arm or to connect it without the assistance of tools and without special knowledge thereby simplifying assembly particularly for the layman.

In addition, it is advantageous if the limit has a shoulder for determining the detachment angle.

Moreover, it is advantageous if the detachment angle is between 5 and 50°, particularly between 20 and 40°, preferably between 20 and 30°, ideally approx. 25°, because this guarantees a secure hold of the connecting device without impeding handling when replacing the wiper blade.

In this case it is particularly advantageous if a limit stop is provided, which is formed in particular by an edge or surface of the receptacle, which prevents rotation beyond the detachment angle. In particular, this further simplifies replacing the wiper blade.

Ideally, the longitudinal shaped portion is dimensioned in such a way that it is able to accommodate the shoulder when detaching and/or connecting the connecting parts.

In a simple embodiment, the receptacle is advantageously embodied to be groove-shaped and is comprised of in particular two side walls and a base, which in particular is essentially embodied to be flat. This is simple to manufacture in an injection molding process and extremely cost-effective as a result.

In this connection, it is particularly advantageous if the shaped portion is arranged on the base, in particular in the area of one of the side walls.

Furthermore, it is advantageous if the first connecting part has a spoiler wall, which forms the entire height of the first connecting part and terminates one spoiler side. This produces an outward appearance that is especially favorable in terms of flow and also achieves an especially pleasing visual appearance.

The securing means terminates essentially flush with the first connecting part in an especially simple, cost-effective and pleasing manner.

A flat bar wiper blade in accordance with the invention with a first connecting part for fastening the flat bar wiper blade to a wiper arm, which is comprised of a counter-hinge element so that the flat bar wiper blade can be connected to the wiper arm so that it can be swiveled around a hinge axis, in which a groove-shaped receptacle for accommodating a securing means is provided, in which a longitudinal shaped portion, particularly a groove, is provided which is parallel to the hinge axis, features especially good flow behavior so that the wiper blade is guided securely on the window even at high wind speeds. In addition, this renders possible a connection to a wiper arm that is secure, reliable and simple to operate.

In this case, it is advantageous if a spoiler is provided and the first connecting part has a spoiler wall, which essentially accommodates the spoiler in its cross section and terminates the first connecting part on the spoiler side. This further improves the flow behavior of the flat bar wiper blade thereby achieving an optimal wiping result even at high vehicle speed.

It is especially advantageous in this case if the counter-hinge element is embodied as a circular opening, which is able to accommodate a hinge bolt. This type of wiper blade is quick and easy to replace and simple and cost-effective to manufacture.

BRIEF DESCRIPTION OF THE DRAWINGS

One exemplary embodiment of the invention is depicted in the drawings and explained in greater detail in the following description. The drawings show.

DETAILED SUMMARY

Figure 1:
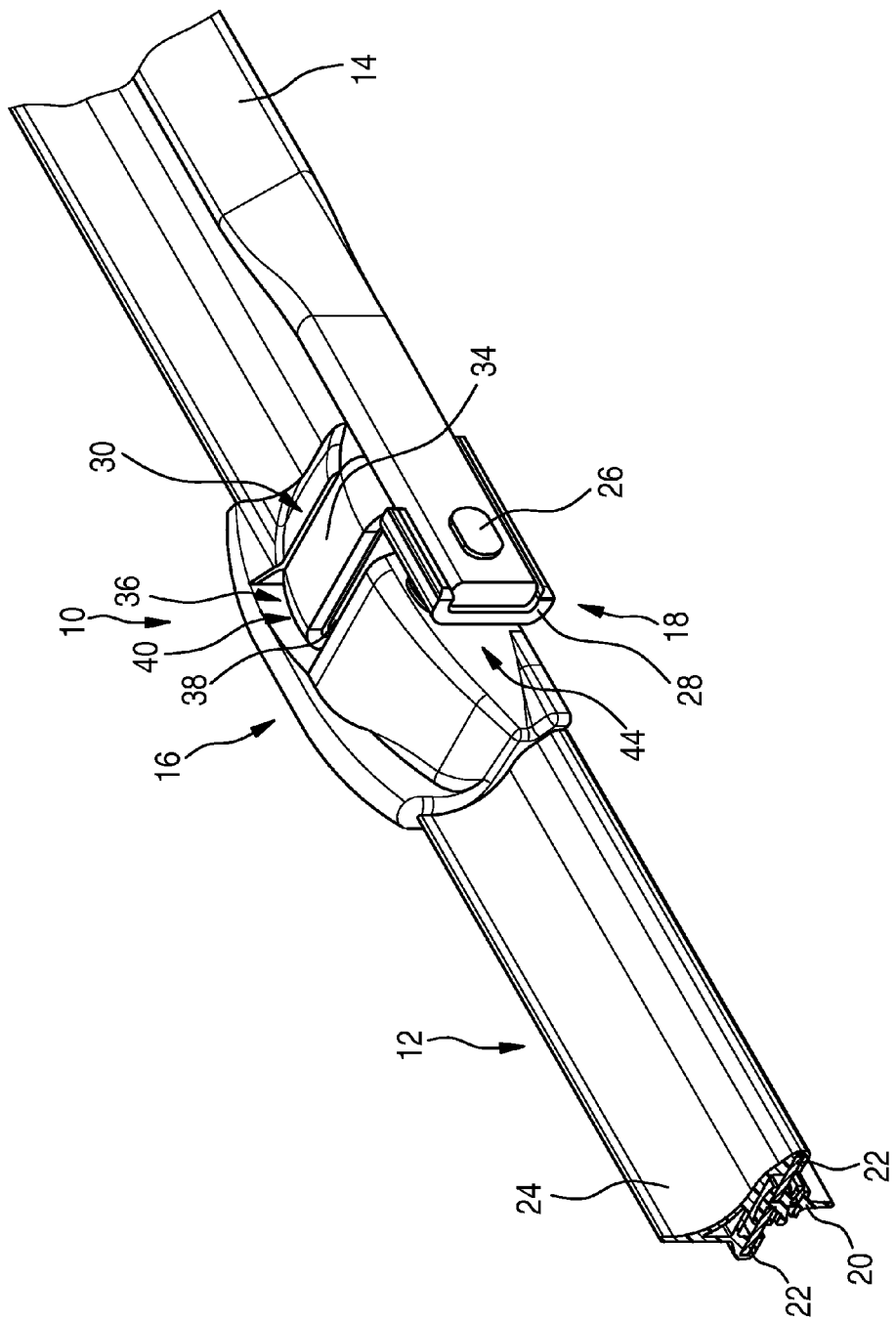
FIG. 1 A perspective representation of a mounted connecting device in accordance with the invention FIG. 2 A top view of the connecting device with the first and second connecting parts from FIG. 1

FIG. 1 depicts the connecting device 10 in accordance with the invention with a section of a wiper blade 12 and of a wiper arm 14. The connecting device 10 is comprised essentially of a first connecting part 16 that is fastened to the wiper blade 12 as well as a second connecting part 18 that is fastened to the wiper arm 14. The wiper blade 12 is embodied as a so-called flat bar wiper blade, and is comprised essentially of a wiper blade rubber 20, which is held on a resilient rail 22. In order to improve the flow properties, a spoiler 24 is fastened on the side of the resilient rail 22 facing away from the wiper blade rubber 20, in particular slid onto the resilient rail 22, which is embodied of a rubber elastic material. The first connecting part 16 is firmly connected to the resilient rail 22 so that the wiper blade 12 is held securely on the first connection 16.

The wiper arm 14 bears the second connecting part 18 on its free end; the wiper arm 14 in this case is embodied in the area of its free end as a single rod, which has an essentially rectangular cross section. The side of the rod that has a longer cross section runs perpendicularly to the window, which is not shown here for the sake of providing an unimpaired view. As a result, the longer side of the rectangular cross sections runs essentially parallel to the longitudinal extension of the cross section of the wiper blade 12. The second connecting part 18 is embodied here as a sheet metal bent part and grips around the free end of the wiper arm 14 with a first section 28 in a clamp-like manner. A second section 30 of the second connecting part 18 extends perpendicularly from the free end of the wiper arm 14 in the direction of the first connecting part 16 and overlaps it in a bridge-like manner. A securing means 32 is formed as a result, which is formed by a bridge 34 of the second section 30, which is terminated by a limit 36. The bridge 34 runs approximately perpendicularly to the longitudinal extension of the wiper arm 14, parallel to the surface of the window or approximately parallel to the plane which is formed by the resilient rails 22.

The first connecting part 16 has a receptacle 38 to accommodate the bridge 34 and a pocket 40, wherein in a connected state, the bridge 34 is accommodated in the receptacle 38 and the limit 36 in the pocket 40. As a result, the first connecting part 16 and the second connecting part 18 engage with one another.

In addition, provided on the second connecting part 18 is a bolt 26, which extends in the direction of the longitudinal extension of the wiper arm 14 at a distance from the bridge 34. The longitudinal extension of the bolt 26 runs perpendicularly to the longitudinal extension of the wiper arm 14 and therefore approximately parallel to the bridge 34. The bolt 34 engages in a counter-hinge element 42, which is embodied here as a pocket hole (FIG. 4), thereby forming a hinge element 44. The first connecting part 16 is thus rotatably connected to the second connecting part 18.

The bolt 26 is embodied in this case in such a way that it fastens the second connecting part 18 to the free end of the wiper arm 14 on the one hand and at the same part is part of the hinge element 44.

Figure 2:
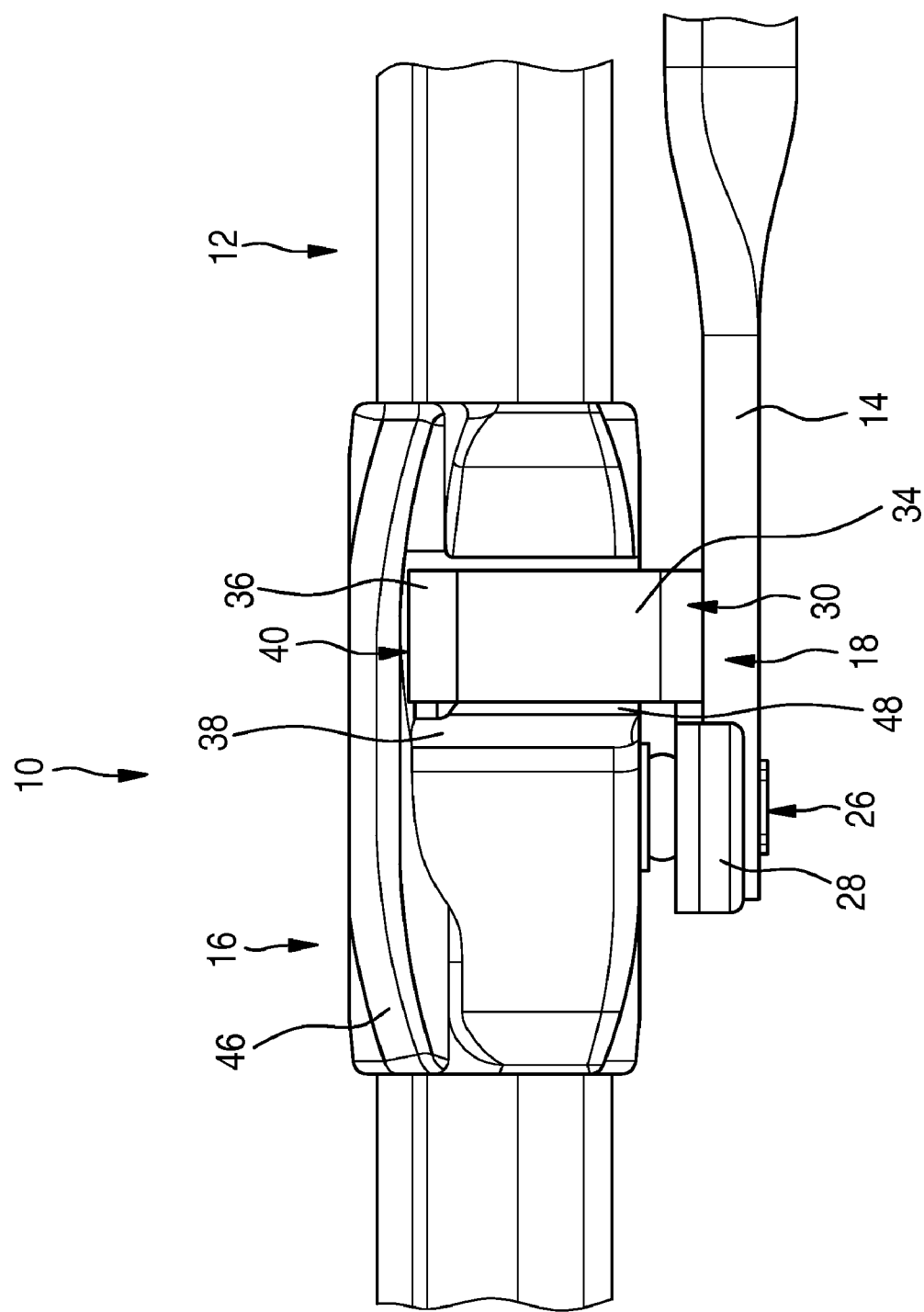

FIG. 2 shows a top view of the connecting device 10 in accordance with the invention as well as the wiper blade 12 and the free end of the wiper arm 14. The free end of the wiper arm 14 is shown in its rectangular form perpendicular to the plane of the window, which in this case corresponds to the plane of the blade. Fastened to it is the second connecting part 18, with its first section 28 and its second section 30. The first section 28 clamps around the free end of the wiper arm 14 and is fastened to the wiper arm 14 by the bolt 26. The bolt 26 projects (not visible here) into the first connecting part 16. The second section 30 with the securing means 32 is arranged at a distance from this hinge axis, which is formed by the bolt 26. The securing means is comprised of the bridge 34, which is delimited by the limit 36. The bridge 34 in this case is inserted into the receptacle 38 of the first connecting part 16 so that an essentially smooth surface of the first connecting part 16 is produced. The limit 36 is inserted into the pocket 40 of the first connecting part. In the area of the pocket 40, the first connecting part 16 also has a spoiler wall 46, which essentially terminates the first connecting part 16. On the side of the receptacle 38 facing the hinge axis and therefore the bolt 26, the receptacle 38 is so much wider than the bridge 34 that a gap 48 is created, and namely such that the second connecting part 18 can be rotated around the hinge axis with respect to the first connecting part 16 by a detachment angle 50.

Figure 3:
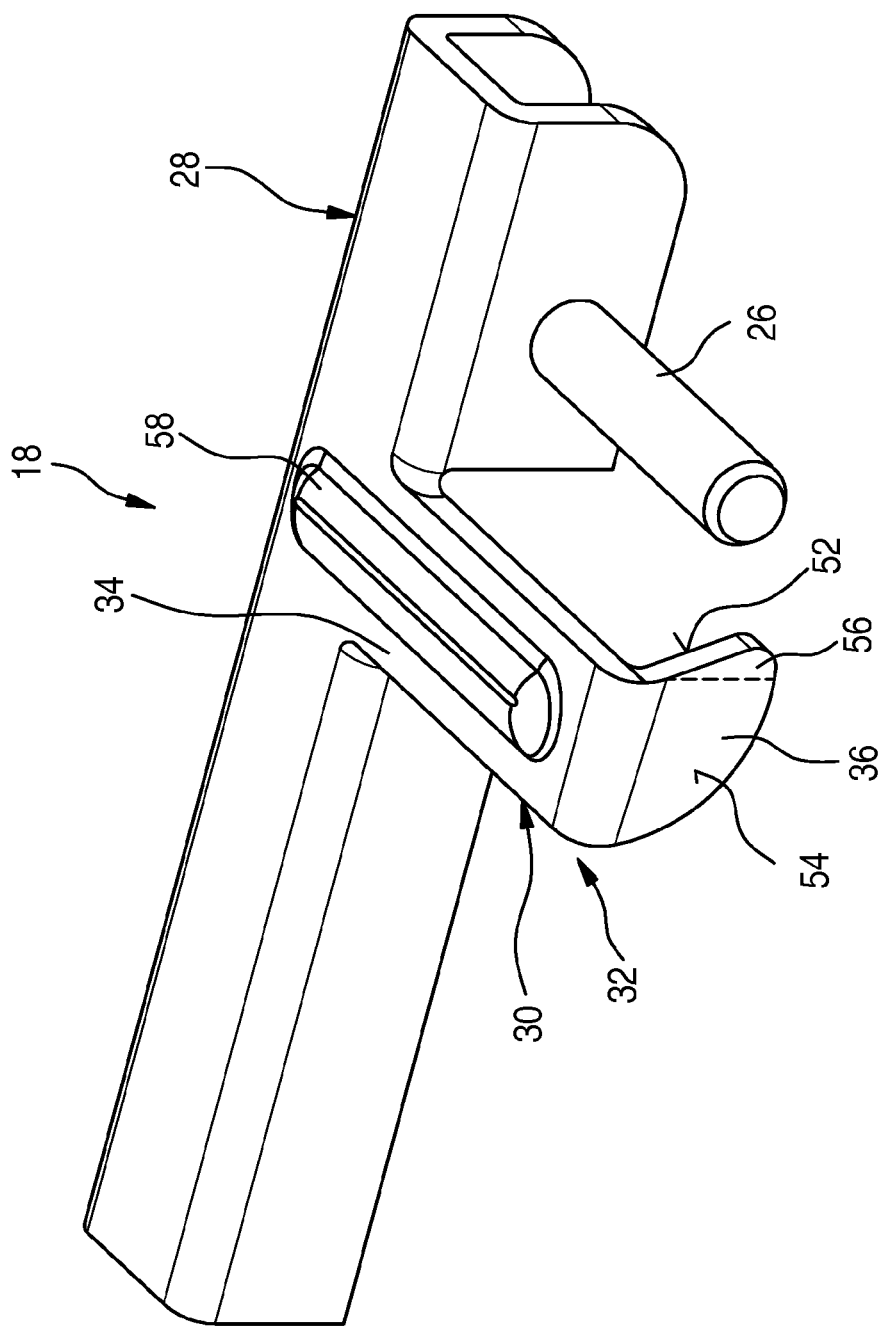
FIG. 3 A perspective representation of the free end of a wiper arm with the second connecting part of the connecting device located on the wiper arm side FIG. 4 A perspective representation of the mounted, first connecting part of the connecting device located on the wiper blade side FIG. 5 A side view of the connecting part from FIG. 4

FIG. 3 depicts a variation of the second connecting part 18 of a connecting device 10 in accordance with the invention, which, however, is constructed to be functionally identical. The same elements were therefore identified by the same reference numbers. The bolt 26 that forms the hinge axis is fastened on the first section 28 of the second connecting part 18. At a distance from this is the securing means 32, which is essentially comprised of the bridge 34 and the limit 36. The limit 36 projects perpendicularly downward and is embodied to be a single piece with the bridge 34. As a result, both an inner wall 52 and an outer wall 54 are formed on the limit 36. The inner wall 52 and the outer wall 54 limit the axial movement on the hinge axis by forming limit stops in the pocket 40 of the first connecting part 16.

In addition, the limit 36 has a shoulder 56 to stabilize and improve fastening and said shoulder enlarges the limit 36 in the direction of the bolt 26 and therefore in the direction of the hinge axis. For stabilization purposes, a raised portion 58 is also embodied on the bridge 34, which increases the flexural strength of the bridge 34. Typically, the raised portion 58 is bent directly out of the sheet metal of the bridge 34. In a variation of the invention, the raised portion 58 can also be embodied downward, i.e., as an indentation.

Figure 4:
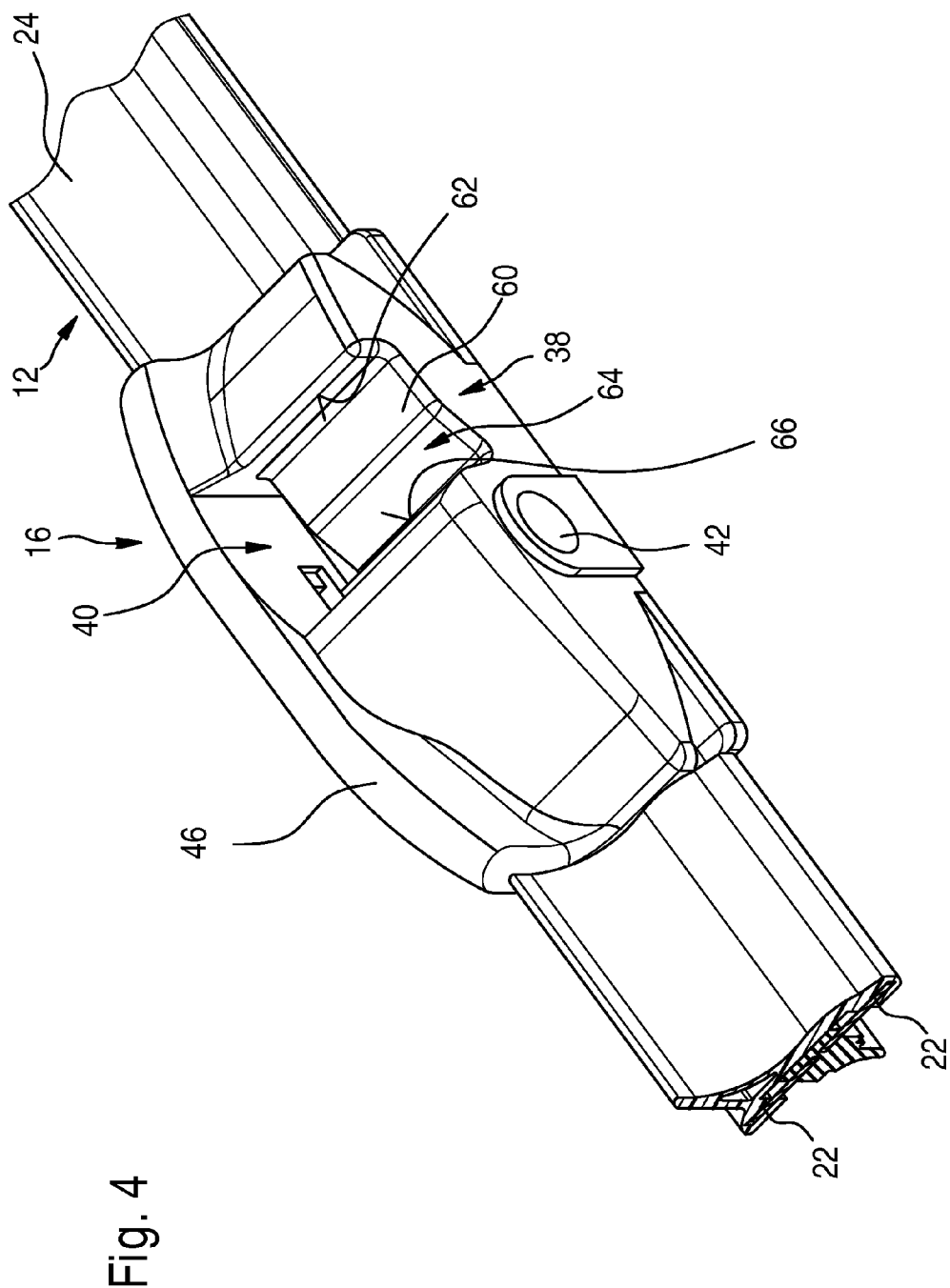

FIG. 4 shows a perspective representation of the first connecting part 16 of a connecting device 10 in accordance with the invention with the wiper blade 12. The wiper blade 12 is comprised of a spoiler 24, which is fastened to the resilient rail 22. Just like the spoiler 24, the first connecting part 16 is also fastened to the resilient rail 22. In a variation, the first connecting part 16 can also be fastened to the spoiler 24. The first connecting part 16 has an opening as a counter-hinge element 42, which is used to accommodate the bolt 26 so that a hinge element 44 (FIG. 1) is formed together with the bolt 26. The opening 42 can be embodied in this case as a continuous hole or as a pocket hole.

The receptacle 38, which is able to accommodate the bridge 34 in a mounted state, is at a distance from its hinge axis, which is formed by the bolt 26 and the counter-hinge element 42. The receptacle 38 is comprised in this case of a base 60 as well as a first side wall 62 and a second side wall 64, which is arranged on the side of the receptacle 38 facing the hinge element 44. The base 60 of the receptacle 38 has a longitudinal shaped portion 66 in the area of the second side wall 64, which runs parallel to the hinge axis and therefore parallel to the counter-hinge element 42. In this case, the longitudinal shaped portion 66, just like the receptacle 38, extends from the pocket 40 to the outer limit of the first connecting part 16 so that the shoulder 56 of the second connecting part is able to glide through the longitudinal shaped portion 66. In its inner contour, the pocket 40 follows the limit 36 with the shoulder 56 of the second connecting part 18.

Figure 5:
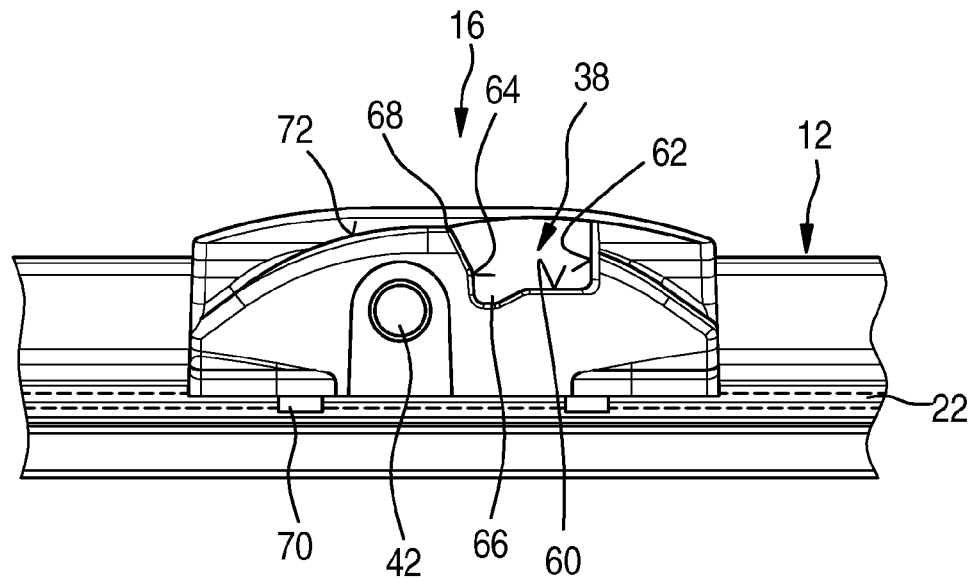

FIG. 5 shows a side view of the wiper blade 12 with the first connecting part 16 of the connecting device 10 in accordance with the invention. The view in this case is from the side on which the wiper arm 14 or the second connecting part 18 is arranged in a mounted state. In cross section, the first connecting part 16 has a turtle-shaped, hump-shaped upper side 72, which is terminated on one side by the spoiler wall 46. The spoiler wall 46 projects in this case beyond the turtle-shaped surface 72. The counter-hinge element 42, which is used to accommodate the bolt 26 (FIG. 1), is arranged at a distance from the receptacle 38 in the longitudinal direction of the wiper blade 12. The receptacle 38 is comprised of the base 60, the first side wall 62 and the second side wall 64. The longitudinal shaped portion 66, which extends downward in the direction of the resilient rail 22, is provided in the base 60 in the area of the second side wall 64. The first side wall 62 runs essentially perpendicularly to the base 60. The second side wall 64 with the base 60 therefore encloses an angle of over 90°, in particular of over 100°. In this way, a groove-shaped longitudinal shaped portion 66 is produced, through which the shoulder 56 of the limit 36 of the second connecting part 18 can be guided during assembly. The depth of the receptacle 38 or the height of the first side wall 62 in this case is dimensioned in such a way that the bridge 34 of the securing means 32 of the second connecting part 18 can be completely accommodated such that the turtle-shaped curved upper side of the first connecting part 16 terminates just approximately flush except for the gap 48.

The base 60 and the bridge 34 in this case have a width of between 3 mm and 15 mm, in particular between 5 mm and 10 mm, preferably between 7 mm and 9 mm, ideally 8 mm. The bridge 34 in this case has a length between 10 mm and 30 mm, in particular between 15 mm and 25 mm, preferably between 18 mm and 23 mm, ideally approximately 22 mm. These dimensions allow adequate stability to be achieved with an especially compact design.

In the upper area of the second side wall 64 facing away from the longitudinal shaped portion 66, an edge 68 is formed by a planar section so that when the bridge 34 is rotating with respect to the first connecting part 16 it cannot rotate beyond a predetermined detachment angle 50. As a result, a limit stop is formed, which brings about simple detachment of the two connecting parts 16, 18. The second side wall 64 can also comprise a first section and a second section, wherein the first section projects approximately perpendicularly from the base 60 and the second section, which is adjacent to the first section, encloses an opening angle of greater than 180 degrees with the base 60. The width of the base 60 is then selected to be approximately as large as the width of the bridge 34, wherein the gap 48 is formed by the opening angle of the second section.

The first connecting part 16 is clamped firmly on the spring rail 22 by clamping elements 70. The longitudinal shaped portion 66 in this case is dimensioned in such a way with the shoulder 56 of the second connecting part 18 (FIG. 3) that the detachment angle 50 is approximately 25 degrees, i.e., that by rotating the first connecting part 16 by 25 degrees with respect to the second connecting part 18, the axial locking of the hinge element 44 is lifted since the limit 36 is situated in cross section completely within the receptacle 38 with the longitudinal shaped portion 66. As a result, through an axial displacement on the hinge axis or on the bolt 26, the first connecting part 16 can be detached from the second connecting part 18.

Figure 6:
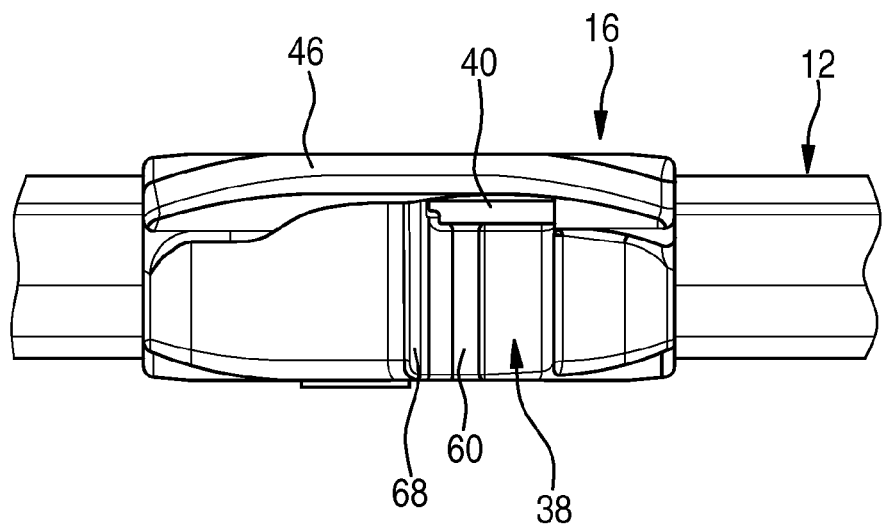
FIG. 6 A top view of the connecting part from FIG. 4

FIG. 6 shows a top view of the first connecting part 16 of the connecting device 10 in accordance with the invention with the wiper blade 12. The turtle-shaped surface 72 of the first connecting part 16 is interrupted by the receptacle 38. Said surface is limited along the longitudinal extension of the receptacle 38 on one end by the spoiler wall 46. Arranged between the spoiler wall 46 and the receptacle 38 is the pocket 40, which is able to accommodate the limit 36 with the shoulder 56 of the second connecting part.

Figure 7:
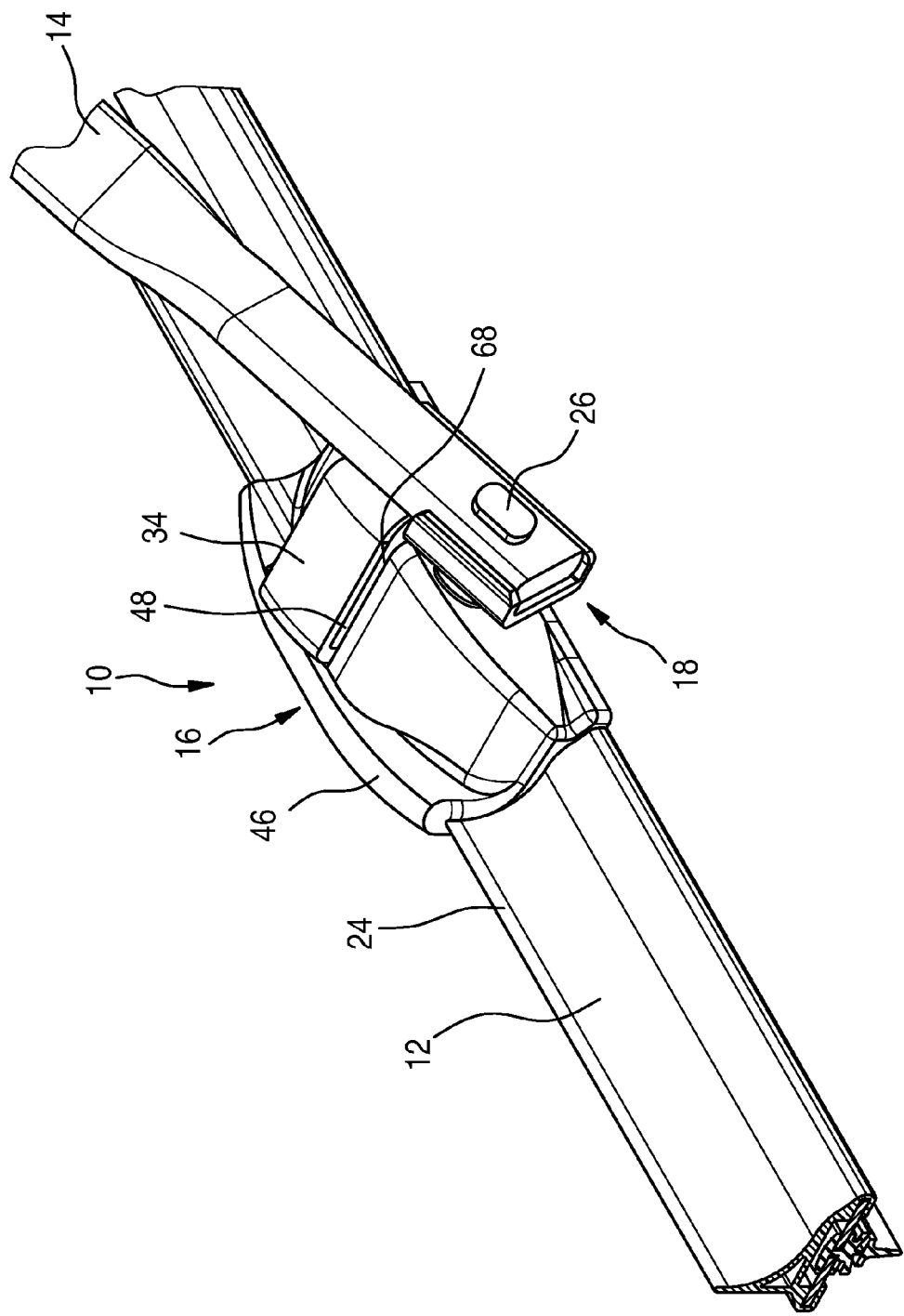
FIG. 7 A perspective representation of the connecting device at the beginning of a detachment process FIG. 8 A perspective representation of the connecting device in the middle of the detachment process FIG. 9 A side view of the connecting device during the detachment process.

FIG. 7 depicts the connecting device 10 in accordance with the invention as well as the free end of the wiper arm 14 and the wiper blade 12 in the detachment position, i.e., in the position in which both of the connecting parts 16, 18 can be detached. The bridge 34 in this case is tilted up to the edge 68 by a rotation around the hinge axis or around the bolt 26 so that the bridge 34 hits the edge 68. The spoiler wall 46 in this case fits snugly over the spoiler 24 and projects a little bit over the spoiler 24. The spoiler 24 is integrated into the spoiler wall 46 in this manner.

Figure 8:
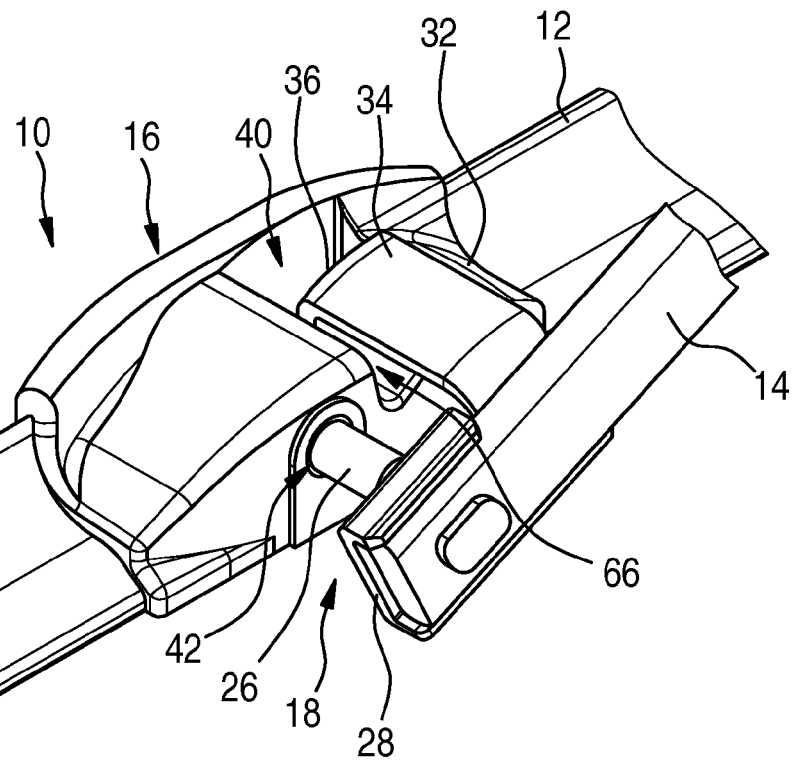

FIG. 8 shows a connecting device 10 in accordance with the invention during the detachment process. The first connecting part 16 is fastened to the wiper blade 12 and the second connecting part 18 is fastened to the wiper arm 14. The second connecting part 18 grips around the wiper arm 14 with its U-shaped first section 28. The bolt 26 projects out of the base of the U-shaped section 28 perpendicularly to the longitudinal extension of the wiper arm 14 into the opening of the first connecting part 16 forming the counter-hinge element 42. The second section 30 of the second connecting part 18, which is formed by the securing means 32 with the bridge 34 and the limit 36, is shown here rotated around the detachment angle 50 so that the limit 36 is pulled out of the pocket 40 by the rotation around the hinge element 44. During axial displacement of the two connecting parts 16, 18, the limit 36 glides through the receptacle 38, whereby the shoulder 56 (FIG. 3) moves through the longitudinal shaped portion 66. The first connecting part 16 and the second connecting part 18 are thus no longer engaged with one another.

Figure 9:
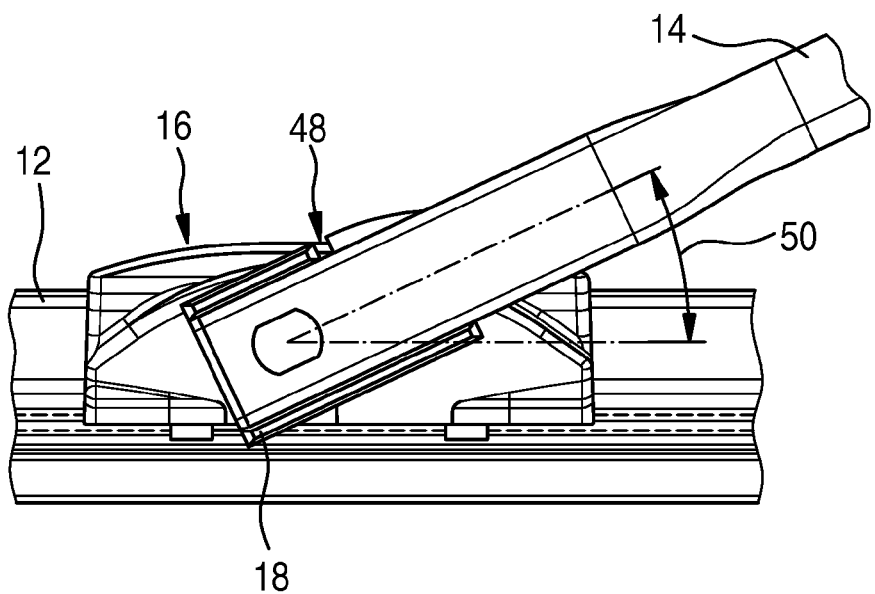

FIG. 9 shows a side view of the connecting device 10 from FIG. 8 during detachment. The wiper arm 14, which bears the second connecting part 18, and the wiper blade 12, which bears the first connecting part 16, are rotated around the detachment angle 50 of approximately 25 degrees. In this way, the limit 36 with the shoulder 56 is pulled out of the pocket 40 so that the wiper blade 12 can be detached from the wiper arm 14 by an axial displacement on the hinge axis. As described in FIG. 8, the shoulder 56 then moves through the longitudinal shaped portion 66 and the remaining area of the limit 36 through the receptacle 38 that is essentially U-shaped in cross section. The gap 48 in this case is still very small or equal to 0 since in this position the bridge 34 hits against the limit stop, which is formed by the edge 68.

The first connecting part in this case is embodied as a plastic injection molded part. It can also be reinforced by an additional sheet metal bent part or be embodied of fiber-reinforced plastic. An embodiment of the entire first connecting part as a sheet metal bent part is also possible. The second connecting part 18 is embodied as a sheet metal bent part and compressed, crimped or adhered on the free end of the wiper arm 14. It is just as possible, as shown here, to embody the second connecting part 18 in such a way that it is fastened positively or frictionally to the free end of the wiper arm 14. In addition, the bolt 26 can pass through the free end of the wiper arm 14 and be secured to it or fastened in another manner, for example by laser or induction welding. In particular, the fastening can be accomplished in such a way that with a mere form closure between the free end of the wiper arm 14 and the second connecting part 18 it is still locked by the bolt 26. In a simple and cost-effective variation, the second connecting part can naturally also be embodied of plastic or fiber reinforced plastic. Even a combination as a plastic part with sheet metal reinforcement is possible.

In another variation, rubber elastic damping elements can be arranged in the area of the pocket 40 and/or in the area of the bridge 34 on the wiper arm side in order to minimize noise during wiper operation and/or to equalize tolerances.

The invention claimed is:

1. Connecting device (10) for a wiper arm (14) and a wiper blade (12), with a first connecting part (16) on the wiper blade and a second connecting part (18) on the wiper arm, which parts are juxtaposed in an operational position and are connected to each other via a hinge element (44) including a bolt (26) and a counter-hinge hole (42) so that the first and second connecting parts (16, 18) can be swiveled around a hinge axis and partially engage with one another at least via securing means (32) including a bridge (34) and a limit (36), characterized in that the first connecting part (16) has a receptacle (38) for accommodating the securing means (32), the receptacle (38) having a base (60) and a longitudinal shaped portion (66) that extend parallel to the hinge axis and to each other, characterized in that the first connecting part (16) is one of detachable from and connectable to the second connecting part (18) by rotation of at least one of the connecting parts (16, 18) around the hinge element (44) by at least a detachment angle (50), characterized in that the limit (36) has a shoulder (56) and the longitudinal shaped portion (66) is a groove, characterized in that the groove is dimensioned to accommodate the shoulder (56) when one of detaching and connecting the connecting parts (16, 18), characterized in that the bridge (34) substantially covers and is positioned above the base (60) and the groove when the first connecting part (16) is connected to the second connecting part (18), and characterized in that the base (60) is positioned a first distance from the bridge (34) extending in a direction parallel to the limit (36) and the groove is positioned a second distance from the bridge (34) extending in a direction parallel to the limit (36) when the first and second connecting parts (16, 18) are in the operational position, the second distance being greater than the first distance.

2. Connecting device (10) according to claim 1, characterized in that the bridge (34) at least partially overlaps the first connecting part (16) and the limit (36) is arranged such that, in the operational position, the first connecting part (16) and the second connecting part (18) are locked against axial displacement on the hinge axis.

3. Connecting device (10) according to claim 1, characterized in that the shoulder (56) abuts the longitudinal shaped portion (66) at the detachment angle (50), which is between 15 and 50 degrees.

4. Connecting device (10) according to claim 1, characterized in that the limit stop (36) prevents rotation beyond the detachment angle (50).

5. Connecting device (10) according to claim 1, characterized in that the receptacle (38) is embodied to be groove-shaped, having two side walls (62, 64) and a base (60).

6. Connecting device (10) according to claim 5, characterized in that the longitudinal shaped portion (66) is arranged on the base (60).

7. Connecting device (10) according to claim 6, characterized in that the shaped portion (66) is arranged on the base (60) in the area of one of the side walls (62, 64).

8. Connecting device (10) according to claim 5, characterized in that the base (60) is essentially flat.

9. Connecting device (10) according to claim 1, characterized in that the first connecting part (16) has a spoiler wall (46), which forms an entire height of the first connecting part (16) and terminates one spoiler side, characterized in that the wiper blade (12) has a spoiler (24), and characterized in that the spoiler wall (46) and the spoiler (24) are oriented at an acute angle with respect to the bolt (26) to urge the connecting device (10) and the wiper blade (12) against a windshield of a vehicle in response to wind flowing past the vehicle while the vehicle is in motion.

10. Connecting device (10) according to claim 1, characterized in that the securing means (32) terminates essentially flush with the first connecting part (16).

11. Connecting device (10) according to claim 1, characterized in that the shoulder (56) determines the detachment angle (50), which is between 20 and 40 degrees.

12. Connecting device (10) according to claim 1, characterized in that the shoulder (56) determines the detachment angle (50), which is between 20 and 30 degrees.

13. Connecting device (10) according to claim 1, characterized in that the shoulder (56) determines the detachment angle (50), which is approximately 25 degrees.

14. Connecting device (10) according to claim 1, characterized in that the limit (36) is formed by an edge (68) or surface of the receptacle (38).

15. Connecting device (10) according to claim 1, characterized in that the receptacle (36) includes a pocket (40) that receives the limit (36) and substantially surrounds the limit (36) when the first connecting part (16) is connected to the second connecting part (18).

16. Connecting device (10) according to claim 1, characterized in that the groove extends along substantially an entire longitudinal width of the first connecting part (16) and connects to the pocket (40).

17. Connecting device (10) according to claim 1, characterized in that the limit (36) slides through the groove to one of detach and connect the first connecting part (16) and the second connecting part (18), and characterized in that the groove is at least partially aligned with the counter-hinge hole (42) in an elongate direction of the wiper blade (12).

18. Flat bar wiper blade (12), with a first connecting part (16) for fastening the flat bar wiper blade (12) to a wiper arm (14), which is comprised of a counter-hinge element (42) so that the flat bar wiper blade (12) can be connected to the wiper arm (14) so that it can be swiveled around a hinge axis, characterized in that a groove-shaped receptacle (38) for accommodating a securing means (32) of a second connecting part (18) is provided, the receptacle (38) having a base (60) and a longitudinal shaped portion (66) that extend parallel to the hinge axis and to each other, characterized in that the longitudinal shaped portion (66) is a groove extending parallel to the hinge axis to permit the securing means (32) to slide therethrough in a direction parallel to the hinge axis upon one of connecting and disconnecting the first connecting part (16) to a second connecting part, characterized in that the longitudinal shaped portion (66) is at least partially aligned with the counter-hinge element (42) in an elongate direction of the flat bar wiper blade (12), and characterized in that the base (60) is positioned a first distance from the securing means (32) extending in a direction perpendicular to a plane extending in the elongate direction of the flat bar wiper blade and in which the hinge axis lies and the groove is positioned a second distance from the securing means (32) extending in a direction perpendicular to the plane when the first and second connecting parts (16, 18) are in the operational position, the second distance being greater than the first distance.

19. Flat bar wiper blade (12) according to claim 18, characterized in that a spoiler (24) is provided and the first connecting part (16) has a spoiler wall (46), which essentially accommodates the spoiler (24) in its cross section and terminates the first connecting part (16) on a spoiler side, and characterized in that the spoiler wall (46) and the spoiler (24) are oriented at an acute angle with respect to the groove to urge the connecting device (10) and the wiper blade (12) against a windshield of a vehicle in response to wind flowing past the vehicle while the vehicle is in motion.

20. Flat bar wiper blade (12) according to claim 18, characterized in that the counter-hinge element (42) is embodied as a circular opening, which is able to accommodate a hinge bolt (26), and characterized in that the securing means (32) includes a limit (36) that is insertable into the receptacle (38) such that the receptacle (38) substantially surrounds a perimeter of the limit (36).

21. Flat bar wiper blade (12) according to claim 18, characterized in that the securing means (32) substantially covers and is positioned above the base (60) and the groove when the first connecting part (16) is connected to the second connecting part (18).

* * * * *

UNITED STATES PATENT AND TRADEMARK OFFICE
CERTIFICATE OF CORRECTION

PATENT NO. : 8,370,986 B2  
APPLICATION NO. : 12/090913  
DATED : February 12, 2013  
INVENTOR(S) : Wilms et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1302 days.

Signed and Sealed this
First Day of September, 2015

Michelle K. Lee
*Director of the United States Patent and Trademark Office*